April 22, 1969  R. H. CUSHMAN  3,439,731
PRESSURE SEALING
Filed May 24, 1966  Sheet 1 of 4
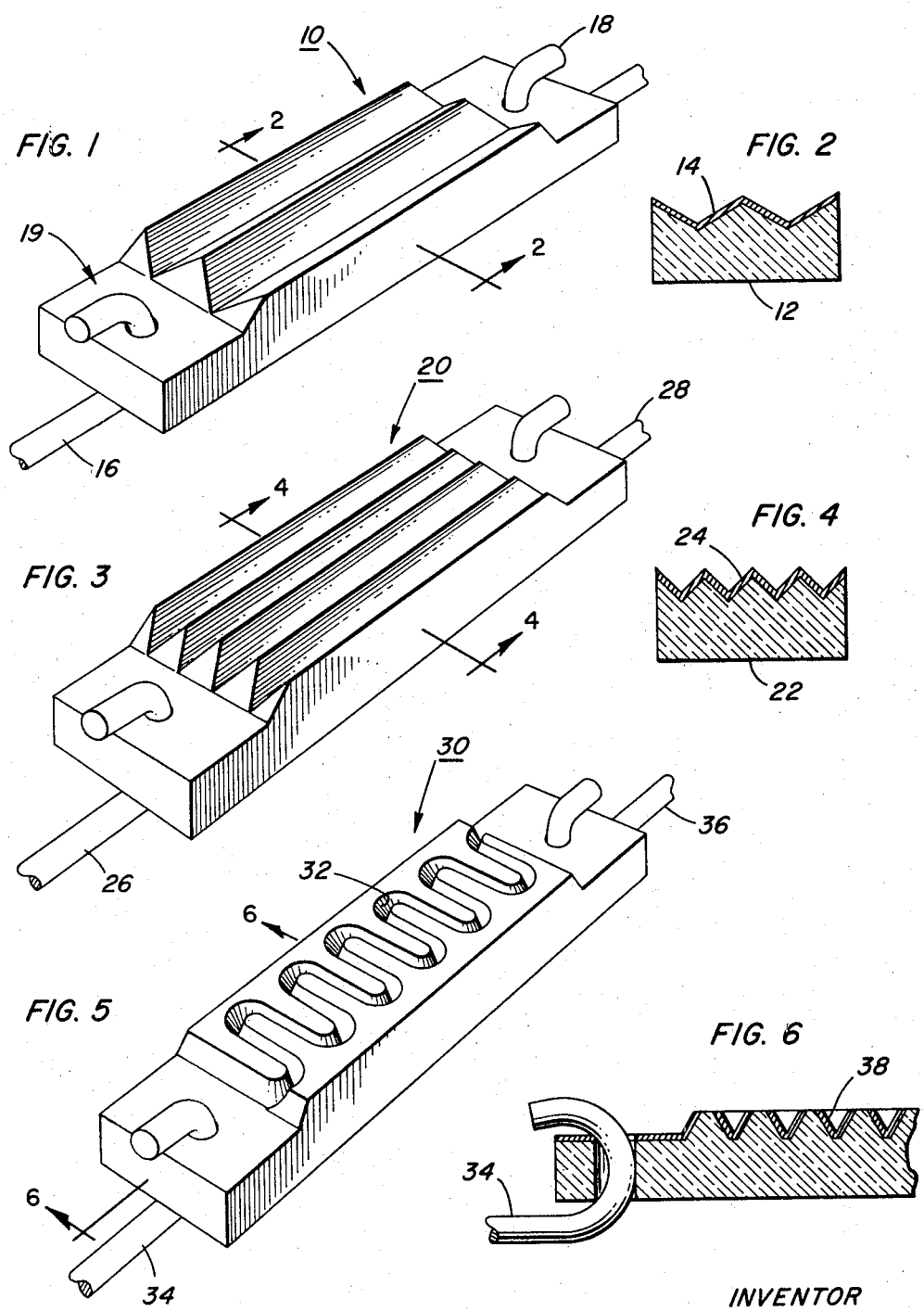
INVENTOR
R. H. CUSHMAN
BY MARN & JANGARATHIS
ATTORNEY

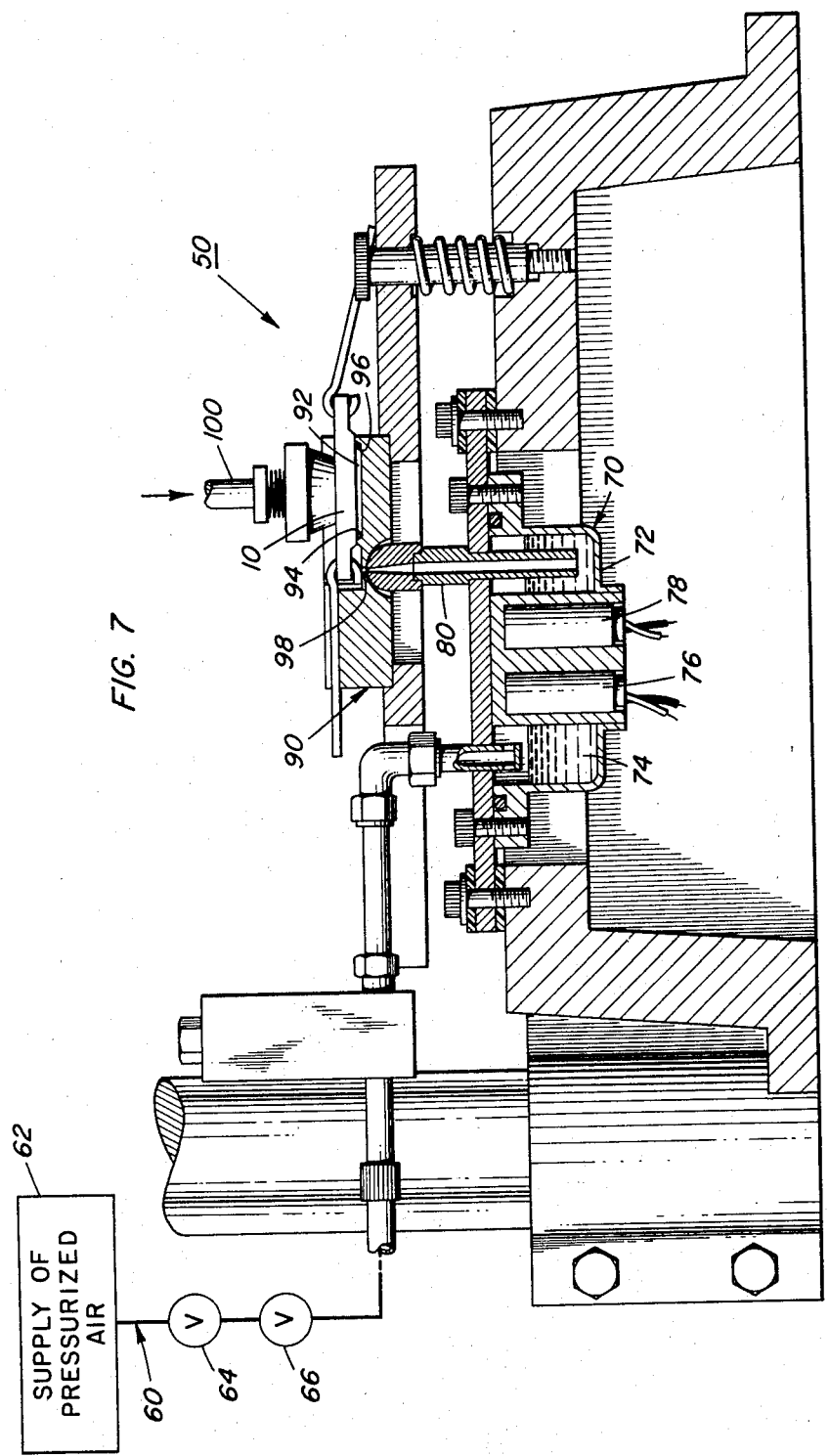

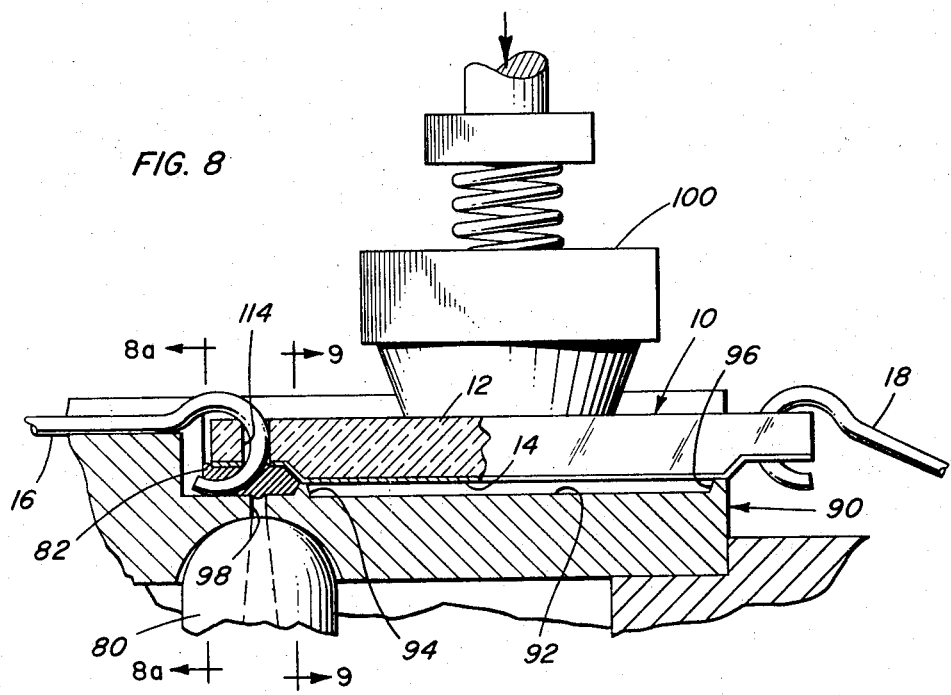
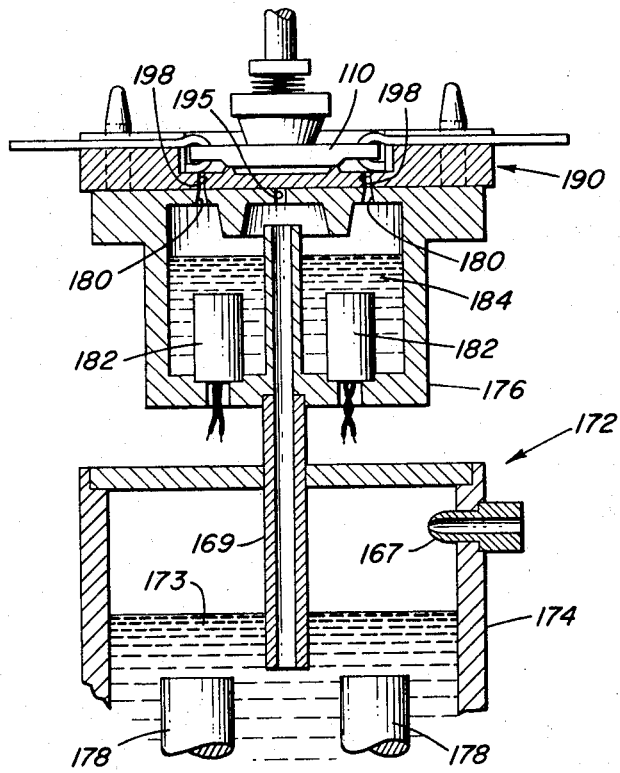

United States Patent Office

3,439,731
Patented Apr. 22, 1969

3,439,731
PRESSURE SEALING
Robert H. Cushman, Princeton Junction, N.J., assignor to Western Electric Company, Incorporated, New York, N.Y., a corporation of New York
Filed May 24, 1966, Ser. No. 552,561
Int. Cl. B22d 19/00
U.S. Cl. 164—108         10 Claims

ABSTRACT OF THE DISCLOSURE

Mold cavities are sealed against the escapement of injected molten metal by controlling the injection pressure of the molten metal such that the material will not leak out of any leak orifices before the molten material solidifies. Surface tension of the molten metal is utilized to prevent leakage through any orifices leading from the mold cavity.

---

This invention relates generally to a method of pressure sealing a mold cavity which is open to the atmosphere and into which molten metal is pressure injected, and more particularly, to a method of manufacture for providing repeatability of operation, and uniformity of product producer thereby, between successive manufacturing operations of soldering leads to electrical components by the die-casting technique.

In general it is highly desirable that a single manufacturing apparatus have the flexibility of performing manufacturing operations on many different workpieces. Such flexibility can be accomplished if new and improved methods are provided which reduce the need for specialized or customized apparatus capable of performing only a single manufacturing operation on a single workpiece.

Further, new and improved manufacturing methods can eliminate the need for the precise positioning of one workpiece with respect to another, where previously required in a single manufacturing operation, and can, thereby, greatly enhance the opportunity for more fully automated manufacturing.

More specifically, in the manufacture of electrical components, probably the most repeated manufacturing operation is that of soldering a lead to an electrical component. Since various electrical components differ markedly from one another in physical size and shape, it has been very difficult in the past, for example, to utilize a single die-casting apparatus to solder leads on different sized and shaped electrical components, without the employment of a differently sized and shaped mold for each different electrical component.

Typically, such die-casting apparatus and molds employ mechanical sealing to confine the injected solder to the desired portions of the lead and electrical component, and to prevent the solder, injected under pressure, from escaping into the atmosphere. In the process of attaching leads to thin film resistors by the die-casting technique, for example, the problem of mold sealing and flexibility of manufacturing apparatus, is greatly accentuated by the fact that the difference in resistance values between resistors is determined by the different physical configuration of the top surface of each resistor. Thus, if the die-casting technique and mechanical sealing are utilized to solder the leads to the resistors (the use of such die-casting technique being highly desirable due to its repeatability of results, its excellent wetting action, the strong mechanical bond, and the consistent shapes, produced thereby) a differently shaped mold must be employed for each different resistor, i.e., one surface of each mold must conform precisely to the top surface of the resistor in order to provide the necessary mechanical seal.

Further, it has been found that different thin film resistors of the same resistance value can differ in size and overall configuration, appreciably. This factor further accentuates the prior art manufacturing problems aforesaid, and further restricts the opportunity of utilizing mechanical sealing to seal a mold cavity.

Obviously, measurable economies in manufacturing time and capital investment, as well as enhanced opportunity for automation, can be achieved if a manufacturing method is employed whereby a single die-casting apparatus, employing a single mold, can be utilized to apply a predetermined volume of solder to only a predetermined area of a lead and an electrical component, irrespective of variations in the top surface configuration of the various resistors.

Pressure sealing, as compared with mechanical sealing, provides excellent cavity sealing and can accommodate a comparatively wide variation in the size and shape of the workpieces, can accommodate insulating parts, allows the surfaces of the mold to be comparatively rough, allows comparatively greater tolerance in the positionment of workpieces within the mold cavity, can accept and seal comparatively larger leak gaps on leak orifices, and allows the use of lower sealing pressures, most significant when fragile parts are involved.

More particularly, it has been discovered that by the use of the technique or method of pressure sealing to seal a mold cavity, which method is described in detail infra, a single die-casting apparatus, using only a single mold, can be utilized to solder leads to resistors of varying top surface configurations, and varying overall configuration, and yet with each differently shaped resistor, the solder is confined to only a selected portion of the lead and the resistor.

In one embodiment of apparatus suitable for practicing the method of the present invention, the mold cavity was merely a generally rectangularly shaped cavity capable of accommodating each of the differently shaped resistors, with the mold surface to be positioned adjacent the top surface of each of the different resistors, not being shaped so as to conform to the top surface of any particular resistor, but rather being merely substantially flat. The mold apertures extending into the mold cavity and for receiving and loosely positioning the leads to be attached to the resistor, were actually in communication with the atmosphere during the time the molten solder was injected under pressure into the cavity. By the practice of the method of the present invention, however, the injected solder was confined to only a predetermined area of the leads and the resistor, the solder did not escape into the atmosphere giving unwanted protrusions of solder extending outwardly, which must be removed, nor did the solder extend over even a portion of the resistance defining top surface of the resistor and, hence, did not alter the resistance value of the resistor.

Accordingly, the primary object of the present invention is to provide a method of pressure sealing a mold cavity.

A further object of the present invention is to provide a method for confining solder to a predetermined area of a workpiece, or workpieces, residing in a mold cavity.

Still another object of the present invention is to provide a method of pressure sealing a mold cavity wherein comparatively low pressures may be employed thereby permitting the presence of fragile workpieces in the mold cavity during the pressure cycle.

A further object of the present invention is to provide a method of pressure sealing a mold cavity which is open to the atmosphere and into which solder is pressure injected to solder a lead to an electrical component.

A still further object of the present invention is to provide a new and improved method of pressure sealing a mold cavity whereby a single die-casting apparatus, employing a single mold, can be utilized to solder leads to electrical components which vary in physical size and shape.

A feature of the present invention is a method of manufacture which may include the steps of inserting a workpiece in a cavity defined by a mold having sufficient thermal mass to solidify the solder, and injecting molten solder at an accurately controlled pressure into the cavity to impinge the molten solder upon a predetermined area of the workpiece, the injection pressure being sufficiently great to cause the molten solder to cover the predetermined area before the molten solder solidifies, and the injection pressure being sufficiently small so that the molten solder will not leak out of any mold leak orifices before the flow of the molten solder is interrupted by the solder solidifying when the predetermined area is covered.

Further, in the interests of automation and large volume production, it is highly desirable that a method of manufacture be provided whereby repeatability of operation, and uniformity of product produced thereby, are achieved between successive manufacturing operations of soldering leads to electrical components by the die-casting techniques.

It has been found that the above-described method of pressure sealing a mold cavity, coupled with the teaching of not permitting the injection pressure to vary more than approximately 1.1:1 between successive manufacturing operations, provides heretofore unknown repeatability of manufacturing operation, and thereby, provides an identity between products produced thereby, in large volume production, which has not been achievable with prior art manufacturing methods.

Accordingly, another object of the present invention is to provide a method of manufacture for providing repeatability and uniformity to successive manufacturing operations for soldering workpieces together by the die-casting technique.

Another feature of the present invention is a method of manufacture for providing repeatability and uniformity to successive manufacturing operations for soldering workpieces together by the die-casting technique, which includes the steps of positioning the workpieces adjacent each other in a mold cavity, injecting molten solders into the mold cavity under accurately controlled pressure sufficiently great to cause the molten solder to cover predetermined areas of the workpieces, but not under pressure sufficiently great to break the surface tension of the injected molten solder at the largest leak orifice of the mold cavity, repeating the foregoing steps for successive manufacturing operations, and maintaining the injection pressure relatively constant, within approximately 1.1:1, for successive manufacturing operations.

A more complete understanding of the present invention may be gained from the following detailed description when read in conjunction with the appended drawings, wherein:

FIGS. 1, 3 and 5 are perspective views of differently shaped thin film resistors;

FIGS. 2, 4 and 6 are cross-sectional views of FIGS. 1, 3 and 5, respectively;

FIG. 7 is a view, partially in section, of die-casting apparatus suitable for the practice of the method of the present invention;

FIG. 8 is an enlarged fragmentary view of a portion of FIG. 7;

FIG. 10 is a fragmentary cross-sectional view of apparatus alternate to that of FIG. 7;

Figure 8A:
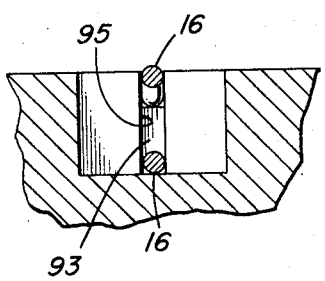
FIG. 8a is a fragmentary cross-sectional view taken along the line 8a—8a in FIG. 8, in the direction of the arrows.

Referring now to FIGS. 1, 3 and 5, there are shown three different thin film resistors 10, 20 and 30, respectively, each of a different resistance value, and each of a different physical configuration. Thin film resistors 10 and 20 are of the same general type, and thin film resistor 30 is of the so-called serpentine configuration.

The resistance value of thin film resistor 10 differs from that of thin film resistor 20 due to the difference in their respective top surface configurations, as shown most graphically in their respective cross-sectional views of FIGS. 2 and 4. In the last mentioned figures, the substrates 12 and 22 are coated with a thin film of tantalum resistance material 14 and 24, respectively. Since there is more resistance material area between the leads 26 and 28 of thin film resistor 20, than between the leads 16 and 18 of thin film resistor 10, thin film resistor 20 is of a lower resistance value.

Variations in resistance values, as between different thin film resistors of the type shown in FIG. 5, are determined by varying the length and surface area of the serpentine path 32 between the leads 34 and 36; the walls of the serpentine path being coated with resistance material 38, FIG. 6.

Typically the leads are soldered to the various thin film resistors, and, as mentioned above, due to its excellent wetting characteristics, the excellent mechanical bond produced thereby, and its capability for providing excellent uniformity of repeated bonding conditions, utilization of the die-casting technique to solder the leads to the thin film resistors is highly desirable.

Obviously, if mechanical sealing were to be employed in the die-casting technique of soldering leads to the differently shaped thin film resistors 10, 20 and 30, respectively, mold seals complementary to the top surface configurations of each of the different resistors would have to be employed, or a differently shaped mold, complementary to each differently shaped resistor, would have to be employed, or else the solder injected under pressure into the mold cavity could not be properly confined.

However, if as aforesaid, a single die-casting apparatus, employing a single mold cavity, could be utilized to solder leads to each of the differently shaped thin film resistors 10, 20 and 30, respectively, the aforementioned economies in manufacturing could be achieved, and the opportunity for automation could be greatly enhanced. The pressure sealing method of the present invention provides such desired method of manufacture.

Figure 11:
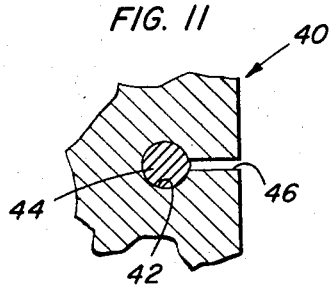
FIG. 11 is a diagrammatic view of a mold, mold cavity and leak orifice.

The present method of pressure sealing a mold cavity can be readily understood by reference to FIG. 11, where there is shown, diagrammatically, a mold represented by the numerical designation 40, a mold cavity represented by the numerical designation 42, a quantity of injected solder represented by the numerical designation 44, and a leak orifice represented by the numerical designation 46; such leak orifice being representative of the unwanted space between mating surfaces of a mold, and also representative of unwanted openings around workpieces (leads for resistors) extending through apertures into a mold cavity.

The pressure which is applied to a supply of molten solder is controlled relatively accurately, and solder 44 (the quantity of which is not accurately controlled) is injected, by such controlled pressure into the plane of the drawing and into the mold cavity 42. The time it takes for the solder 44 to be injected into the mold cavity 42, is also not accurately controlled. However, by controlling the pressure accurately, the injected solder will fill the desired mold area, assuming a desired shape, but will not escape unwantedly into the leak orifice 46. Such controlled injection pressure is sufficient to cause the injected molten solder to cover desired areas of workpieces residing within the mold cavity, but such pressure is not sufficient to break the surface tension of the injected molten solder at the leak orifice, or the largest leak orifice of several orifices. By such confinement of the injected molten solder, the mold cavity is sealed by the present method of pressure sealing.

Such accurate control of the injection pressure permits the use of relatively low sealing pressures, and such low sealing pressures permit the presence of fragile workpieces, such as a ceramic substrate, in the mold cavity during the pressure cycle.

Apparatus suitable for the practice of such method of pressure sealing, is the die-casting apparatus 50 of FIG. 7. Such die-casting apparatus includes solder injection means 60, supply of molten solder 70, solder injection nozzle 80, mold 90, and means 100 for "closing the mold."

The solder injection means 60 includes an air supply 62 and pressure valves 64 and 66. The air supply, through the pressure valves, is in communication (as shown), with the supply of molten solder 70.

The solder supply includes a solder pot 72, containing a quantity of solder 74 which is maintained molten by internal, centrally positioned, electrical heaters 76 and 78. The heaters maintain the solder 74 in a desired molten state (between the melting point of the solder and the maximum temperature feasible without excessive vaporization or decomposition of the solder, typically 1400° F.), but not at any critically controlled temperature.

Upon the delivery of a pulse of air from the air supply 62 to the solder supply 70, a quantity of molten solder is displaced and is forced upwardly of the nozzle 80 into the mold 90.

It will be noted that no metering means are provided for controlling the quantity of the molten solder displaced, thus it will be understood, that the entire content of the solder pot is available for injection. Accordingly, in the practice of pressure sealing, the quantity of molten solder contained in the solder pot can vary as much as approximately 10:1, and yet desired soldering operations can be accomplished.

The mold 90 is an open mold and is provided with a cavity 92 for receiving a thin film resistor, such as thin film resistor 10. The thin film resistor is placed in the mold cavity 92 in inverted fashion, such that the resistance defining top surface of the resistor is downward facing the solder supply. The resistor is supported in the mold cavity by lands 94 and 96 formed in the bottom of the mold cavity near either end. The mold cavity 92 is in communication with the nozzle 80 by means of a gate 98 formed in the bottom of the mold.

The thin film resistor is maintained downwardly in the mold by the ram 100 which is operated by any suitable means (not shown).

Figure 9:
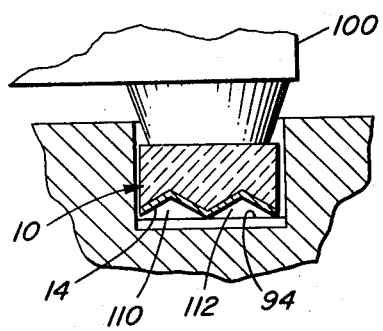
FIG. 9 is a cross-sectional view taken along the line 9—9 in FIG. 8, in the direction of the arrows.

Referring again to the manner in which the thin film resistor is supported in the mold cavity 92, reference is made to the enlarged, fragmentary, sectional view of FIGS. 8 and 9. As shown most clearly in FIG. 8, the inverted thin film resistor is supported in the mold cavity by lands 94 and 96 which engage the irregular, resistance defining surface of the thin film resistor, as may be best seen in the fragmentary cross-sectional view of FIG. 9. It will be noted, as shown in FIG. 9, that there is only a partial mechanical seal blocking off the irregular, resistance defining surface of the resistor, from the flat endward portion of the resistor (such as the flat endward portion 19 as shown in FIG. 1), which portion is to receive the solder in the operation of joining the leads to the resistor. Thus, it will be noted that upon injection of the solder 82 into the mold cavity 92, that but for the method of pressure sealing of the present invention, the solder 82 would escape, through the open areas (leak orifices) identified by general numerical designations 110 and 112 of FIG. 9, onto the irregular, resistance defining surface of the resistor 10 and, hence, would unwantedly alter the value of the resistor.

Further it will be noted from FIG. 8, that there are several unwanted leak orifices attendant to the lead 16 extending into the mold cavity 92. As shown in FIG. 8, one end of the lead 16 is bent in semicircular fashion and is inserted, or hooked, through an aperture 114 formed in the flat endward portion of the thin film resistor 10. The semicircular portion of the lead 16 extending through the aperture 114 does not occupy the entire aperture, and hence, there are open areas (leak orifices) through which the injected solder 82 could escape into the atmosphere were it not for the presence of a sealing technique. Further, from viewing FIG. 8a, it will be noted that the leftward end portion of the mold cavity 92 is open to the atmosphere. In particular, as indicated by numerical designation 93, the void between the portions of the bent lead 16 provides an unwanted leak orifice; also, the leads 16 do not always occupy the entire area between the walls of the groove 95 extending into the cavity 92.

*Operation*

The manner in which the present method of pressure sealing dynamically seals a mold cavity will now be set forth. It will be assumed that the thin film resistance 10 and leads 16 and 18, respectively, occupy the positions shown in FIGS. 7 and 8, and that the ram 100 is maintaining the thin film resistor 10 in the mold cavity 92 downwardly against the lands 94 and 96.

A pulse of air, from the supply of pressurized air 62, is delivered through the pressure valves 64 and 66, to the solder supply 70. The pulse pressurized air acts on the surface of the molten solder 74 and forces a quantity of molten solder upwardly of the nozzle 80 thereby injecting the molten solder into the mold cavity 92. The injected molten solder impinges against the lead 16, surrounds the lead, and impinges against the flat endward portion of the thin film resistor 10.

The pressure under which the molten solder is injected is accurately controlled, by means of the pressure valves 64 and 66. The pressure valves 64 and 66 are adjusted such that the injection pressure is sufficiently great to cause the molten solder to impinge upon the lead 16 and flat endward portion of the resistor 10, as just stated, but is not sufficiently great to break the surface tension of the injected molten solder at the above-mentioned leak orifices. Initially, the pressure valves 64 and 66 may have to be adjusted upwardly or downwardly during the first few cycles of operation, until the above-mentioned injection pressure limitations are set. Thus, as best shown in FIG. 8, the injected solder 82 will be confined and will not extend unwantedly onto the resistance defining surface 14 of the thin film resistor, or extend or escape unwantedly through the opening surrounding the bent portion of the lead 16 within the aperture 114, nor will escape unwantedly into the atmosphere around the end portion of the resistor 10.

The injection pressure is accurately controlled and not permitted to vary more than 1.1:1 between cycles of operation, and such injection pressure control is provided by means of the pressure valves 64 and 66. It will be understood that the expression "the injection pressure is not permitted to vary more than approximately 1.1:1 between cycles of operation," denotes that the pressure is accurately controlled such that the pressure system at any time $t$, in any injection cycle, will be within approximately 1.1:1 of the pressure system at the same time $t$ in any other injection cycle. Further, it will be understood, that pressure is a dynamic consideration and that it varies with respect to time, and the dynamic pressure also varies at different parts in the system at the same time $t$ e.g., the pressure in the solder pot 72 might be 2 lbs. per sq. in., the pressure in the nozzle 80 might be 1 lb. per sq. in., and the pressure in the mold might be 0.25 lb. per sq. in.; all varying simultaneously with respect to time.

Figure 13:
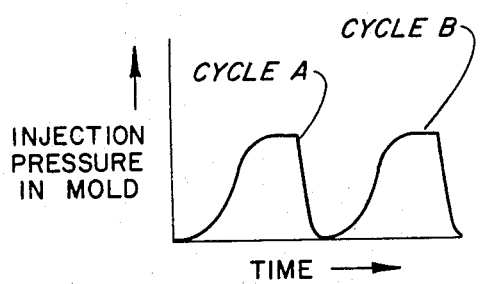
FIG. 13 is a plot of the injection pressure within the mold, with respect to time, for successive injection cycles.

The plot of FIG. 13 by way of further example, is a plot of the injection pressure in the mold, with respect to time, for successive injection cycles, i.e., cycle A and cycle B. Thus, it will be further understood that the plot of each such cycle will not vary more than approximately 1.1:1 with respect to the plot of any other cycle.

Figure 14:
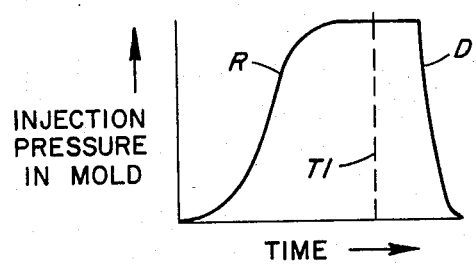
FIG. 14 is an expanded view of any injection cycle of FIG. 13.

FIG. 14 is an expanded view of any injection cycle of FIG. 13; the portion of the curve R indicating the rise time of the pressure in the mold cavity, the portion D indicating the decay time of such pressure, and the dashed vertical line indicating the time $T_1$ in the injection cycle at which time the mold cavity has been filled with solder and the solder has solidified. The time $T_1$ could occur at any time along the flat portion of the curve, and hence could vary as approximately 10:1 from cycle to cycle, and acceptable results are obtainable.

Also, it will be understood by those skilled in the art, that the ratio 1.1:1, insofar as being practically obtainable by actual apparatus, is a close approximation.

Further, great reproducibility of soldering operations is achieved by not permitting the injection pressure to vary more than approximately 1.1:1 between cycles of operation, viz., the injected solder, identified by numeral 82 in FIG. 8, will occupy very closely the same regions as shown in FIG. 8 for repetitive cycles of injection soldering.

The primary heat sink which ultimately freezes or solidifies the injected solder 82, is the mass of the mold 90. However, it will be understood, that the injected solder is still in a molten condition at the time the injected solder reaches its outer limits, which outer limits are controlled by accurately controlling the injection pressure. This condition has been manifested by sections cut through the outer portion of the injected solder, which sections show good wetting action between the solder, the lead and resistor, thus, proving conclusively that the solder was in a molten condition at the time it reached its outer boundaries determined by the present method of pressure sealing.

Referring again to FIG. 8, it will be noted that the injected solder 82 did not extend unwantedly through the aperture 114 and escape into the atmosphere, causing well-known undesirable conditions. This is most significant, when it is appreciated that the substrate material 112 is an insulating material of notoriously poor heat sink characterisitics. It is the tendency of the molten solder once it encounters the substrate material defining the aperture 114, to rush onwardly and escape into the atmosphere. Such unwanted solder escapement, realistically, must prevented in some manner. The typical prior art approach being to provide mechanical sealing, typically, by attempting to dimension the lead and diameter of the aperture 114, such that the aperture closely surrounds the lead, and, hence, mechanically seals off any molten solder attempting to pass therebetween. Obviously, such relative dimensioning gives undesirable manufacturing problems, such as mismatch of leads and apertures, difficulty in inserting leads through apertures, and, hence, prevents ease of automation, which ease of automation is attendant to manufacturing operations wherein the lead may be positioned loosely within the aperture 114. Accordingly, it will be appreciated by those skilled in the art, that since the present pressure sealing method prevents the molten solder from escaping between the lead and the walls of the aperture 114, the lead may be positioned quite loosely within the aperture, and, hence, opportunities for automation are greatly enhanced.

The solder pot 72 and mold 90, of FIG. 7, may be replaced by the solder pot 172 and mold 190, of FIG. 10, respectively. The single nozzle 80 and cavity 90, of FIG. 7, provide injection soldering for but one lead at a time, whereas the structure of FIG. 10 provides for the simultaneous soldering of both leads to the thin film resistor 110. Also, the structure of FIG. 10 accurately controls the solder injection pressure and maintains such pressure within a minimum variation of approximately 1.1:1 between cycles of operation.

More particularly, the alternate structure of FIG. 10 includes a base solder pot 174 and an elevated solder pot 176 which is provided with two nozzles 180—180 for mating engagement with the gates 198—198 formed in the bottom of the mold 190. Electrical heaters 178 maintain the solder 173 in the base solder pot 174 at a low temperature slightly above the melting point of the solder (360° F.), and the electrical heaters 182 maintain the smaller quantity of molten solder 184 in the elevated solder pot 176 at a high temperature, e.g., 1200° F., suitable for injection into the mold 190.

In an actual embodiment of the structure of FIG. 10, the level of the solder 184 in the elevated solder pot 176 was only ⅛″ from the cavity of mold 190, and remains constant at the level, whereas the level of the molten solder 74 of FIG. 7 varied as much as 50%. Thus upon the delivery of a pulse of air by the air nozzle 167, a quantity of lower temperature solder 173 is forced upwardly of the nozzle stem 169 to displace a quantity of higher temperature solder 184. The higher temperature molten solder 184 is forced into the mold cavity, through the respective nozzles 180—180 and gates 190—190. Since the molten solder 184 has only a very small distance to travel, the rise time of the injection pressure is very steep and quite constant for successive cycles of operation and does not vary more than approximately 1.1:1.

The elevated solder pot 176 is provided with an antisiphon feature which includes an air vent 195 which breaks the suction present in the elevated solder pot 176 upon the receding of any molten solder down the nozzle stem 169 back into the lower solder pot 174.

Figure 12:
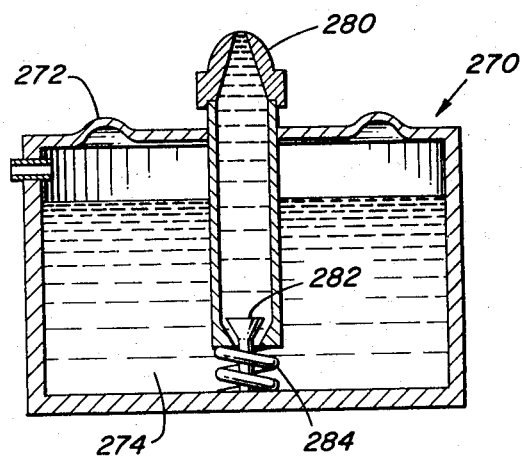
FIG. 12 is a cross-sectional view of a solder supply and nozzle, which is a suitable alternate to similar structure of FIG. 7.

Referring now to the apparatus shown in FIG. 12, the solder pot 270 and nozzle 280 may be utilized alternatively, in the practice of the present pressure sealing method, to accurately control the solder injection pressure and to maintain the solder injection pressure within a minimum variation of approximately 1.1:1 between cycles of operation. The upper surface of the solder pot is a flexible member 272, through which extends a slidably mounted nozzle 280, and which flexible member assists in allowing the nozzle to move up and down. The slidably mounted nozzle is supported at its lower end by a compression spring 284, and the lower end of the nozzle surrounds a valve 282. The supply of molten solder 274 is continuously charged by air, or an inert gas, being introduced into the solder pot under accurately controlled pressure. To inject, a downward force is applied to the nozzle to move the nozzle downwardly to compress the spring and open the valve. The open valve allows the air or gas pressure to force molten solder 274 through the open valve and upwardly through the nozzle 280. Since the molten solder 274 is continuously charged by the accurately pressurized air, or inert gas, the pressure exerted on the molten solder will remain substantially constant and not vary more than approximately 1.1:1 between cycles of operation, regardless of variations in the level of the molten solder. When the downward force is removed from the nozzle, the spring 284 returns the nozzle to its upward position to close the valve 282. In the apparatus of FIG. 13, the supply of molten solder 274 is maintained under constant pressure, and hence, once the valve 282 is opened, the air or gas pressure immediately injects the solder. Such apparatus provides comparatively faster and more constant pressure rise time, and a faster and more constant solder injection rate independent of the level of the solder supply, more accurate control of pressure, and a constant and shortened solder inject distance as the nozzle freezes, thereby staying full of solder after each injection.

It will be appreciated by those skilled in the art that many variations and modifications can be made in the present invention without departing from the spirit and scope of the invention.

What is claimed is:

1. A method for confining solder to a predetermined area of a workpiece, comprising the steps of:
   inserting the workpiece in a cavity defined by a mold having sufficient thermal mass to solidify the solder; and
   injecting molten solder at an accurately controlled pressure into the cavity to impinge the molten solder upon the predetermined area, the injection pressure being sufficiently great to cause the molten solder to cover the predetermined area before the molten solder solidifies, and the injection pressure being sufficiently small so that the molten solder will not leak out of any mold leak orifices before the flow of the molten solder is interrupted by the solder solidifying when the predetermined area is covered.

2. A method of applying solder to a selected area on a component, which comprises:
   positioning the component in a mold so that the surfaces of the component surrounding the selected area are spaced from the walls of the mold to define a solder conducting passage which traverses the selected area;
   maintaining the mold at a temperature sufficient to cause molten solder to solidify; and
   injecting molten solder at an accurately controlled pressure into the solder conducting passage in the vicinity of the selected area, the injection pressure being sufficient to force molten solder to flow into said passage and wet the selected area, said pressure being less than the value which will force said molten solder through said passage beyond said area.

3. A method for confining solder to a predetermined area of a workpiece wherein the workpiece includes an electrical lead inserted through an aperture in a substrate and wherein the solder is to be confined to the immediate area of the substrate through which the lead is inserted, comprising the steps of:
   inserting the workpiece into a cavity defined by a mold having sufficient thermal mass to solidify the solder; and
   injecting molten solder at an accurately controlled pressure into the cavity to direct the solder along the aperture, the pressure being sufficiently great to fill the aperture in the substrate with solder and to cover the area of the substrate immediately about the aperture before the solder solidifies to solder the lead to the substrate, said pressure being sufficiently small so that the flow of solder into the cavity is interrupted by the solder solidifying before it extends beyond the predetermined area.

4. A method of applying solder to a selected area on a component, which comprises:
   positioning the component in a mold so that the surfaces of the component surrounding the selected area are spaced from the walls of the mold to define a solder conducting passage which traverses the selected area;
   maintaining the mold at a temperature sufficient to cause molten solder to solidify; and
   injecting molten solder under an accurately controlled pressure into the solder conducting passage, the pressure being sufficient to force molten solder to cover the selected area prior to solidification thereof on the selected area and adjacent mold surfaces, said pressure being sufficiently small to maintain the surface tension of the injected solder at any leak orifice leading from said solder conducting passage.

5. A method of applying solder to a selected portion of a component, which comprises:
   positioning the component in a mold so that major surfaces thereof surrounding the selected portion are spaced from the walls of the mold to define a solder conducting passage which traverses the selected portion;
   maintaining the mold at a temperature sufficient to cause molten solder to solidify; and
   introducing molten solder under an accurately controlled pressure into the solder conducting passage about the selected portion, said pressure being sufficient to fill the passage with the predetermined volume of solder prior to the solidification thereof, said pressure being sufficiently small to maintain the surface tension of the injected solder at any leak orifice leading from said solder conducting passage.

6. A method of pressure sealing a mold cavity, for successive injection cycles, and to confine pressure injected molten solder to a predetermined area of a workpiece and to prevent the injected molten solder from escaping through a leak orifice, comprising the steps of:
   positioning the workpiece in the mold cavity;
   injecting molten solder into the mold cavity under pressure sufficiently great to cause said molten solder to cover the predetermined area of the workpiece, but not under pressure sufficiently great to break the surface tension of the injected molten solder at the leak orifice of the mold cavity; and
   maintaining the injection pressure constant within approximately 1.1:1 for successive injection cycles.

7. In the process of injecting molten solder into a mold cavity, the method of pressure sealing the mold cavity, which comprises the steps of:
   exerting pressure on said molten solder sufficient to cause the molten solder to fill the cavity,
   accurately controlling said exerted pressure so that it is sufficiently small to maintain the surface tension of the injected molten solder at any leak orifice of the mold cavity, and
   exerting said pressure for a time at least sufficient to cause said molten solder to fill said mold cavity.

8. A method of manufacture for providing repeatability and uniformity to successive manufacturing operations and for soldering workpieces together by die-casting, which comprises the steps of:
   positioning the workpieces adjacent each other in a mold cavity;
   injecting molten solder into the mold, under accurately controlled pressure, sufficiently great to cause the molten solder to cover predetermined areas of the workpieces, but not under pressure sufficiently great to break the surface tension of the injected molten solder at the largest leak orifice of the mold cavity;
   repeating the foregoing steps for successive manufacturing operations; and
   maintaining the injection pressure relatively constant, within approximately 1.1:1, for successive manufacturing operations.

9. A method of manufacture for providing repeatability and uniformity to successive manufacturing operations and for soldering leads to electrical components by the die-casting technique, which comprises the steps of:
   positioning an electrical component in a mold cavity;
   positioning a lead adjacent to the electrical component;
   injecting molten solder into the mold, under accurately controlled pressure, sufficiently great to cause the molten solder to cover predetermined areas of the electrical component and the lead, but not under pressure sufficiently great to break the surface tension of the injected molten solder at the largest leak orifice of the mold cavity;
   repeating the foregoing steps for successive manufacturing operations; and
   maintaining the injection pressure relatively constant, within approximately 1.1:1, for successive manufacturing operations.

10. In the process of injecting molten metal into a mold cavity having one or more leak orifices, the method of pressure sealing the mold cavity, which comprises the steps of:

exerting pressure on said molten metal sufficient to cause the molten metal to fill the cavity, and accurately controlling said exerted pressure so that it is sufficiently small to maintain the surface tension of said molten metal at any leak orifice of the cavity.

References Cited

UNITED STATES PATENTS

| | | | |
|---|---|---|---|
| 3,233,292 | 2/1966 | Kramer et al. | 164—108 X |
| 3,239,895 | 3/1966 | Stuckert | 164—108 X |
| 2,881,487 | 4/1957 | Cerk | 164—333 X |
| 3,032,841 | 5/1962 | Sylvester | 164—119 |
| 3,283,373 | 11/1966 | Kiefer et al. | 164—333 X |
| 3,302,254 | 2/1967 | Moriyama | 164—306 X |

FOREIGN PATENTS 74,813   3/1949   Norway.

J. SPENCER OVERHOLSER, *Primary Examiner.*

R. SPENCER ANNEAR, *Assistant Examiner.*

U.S. Cl. X.R.

164—113; 228—35